United States Patent [19]

Brooks et al.

[11] 3,789,530
[45] Feb. 5, 1974

[54] INVENTORY CONTROL APPARATUS
[76] Inventors: Joe W. Brooks, 1909 Country Club Dr., P.O. Box 1266; Delma C. Waters, East Hiway 44, Drive A.W., both of Eustis, Fla. 32326; Paul J. Ciener, 1560 S. Clayton St., Mount Dora, Fla.
[22] Filed: Aug. 7, 1972
[21] Appl. No.: 278,537

[52] U.S. Cl. ................... 40/124, 40/19.5, 312/234.2
[51] Int. Cl. ............................................... G09f 7/02
[58] Field of Search... 40/19.5, 124, 63 R, 64 R, 65; 312/234, 234.1, 234.2, 234.3, 234.4, 234.5

[56] References Cited
UNITED STATES PATENTS

| | | | |
|---|---|---|---|
| 1,736,235 | 11/1929 | Von Kersburg | 40/19.5 X |
| 1,948,738 | 2/1934 | Thayer | 40/19.5 X |
| 3,070,235 | 12/1962 | Manzardo | 40/19.5 X |
| 1,742,542 | 1/1930 | Howell | 312/234 |
| 404,458 | 6/1889 | Woodruff | 312/234.1 |
| 1,834,423 | 12/1931 | Rider | 40/63 R |
| 2,006,573 | 7/1935 | Isenhour | 40/63 R |
| 2,051,677 | 8/1936 | Brodsky | 40/64 R |

*Primary Examiner*—Wm. H. Grieb
*Attorney, Agent, or Firm*—Newton, Hopkins & Ormsby

[57] ABSTRACT

An inventory control apparatus for an automobile dealer including a housing, a display area on the housing, a means of releasably displaying in assembled relationship within the display area a plurality of cards having information thereon relative to each automobile in the dealer's inventory and a means slidably received in the housing for releasably maintaining keys to the ignitions of each automobile in relative alignment with each respective card. The displaying means comprises a support surface, a resilient covering on the surface, support members transversely disposed on the covering in spaced, parallel relationship and spacer means arranged in spaced, parallel relationship on the covering in perpendicular alignment with the support members. A transparent covering over the display area provides a surface onto which, over each card, removable labels may be placed which contain information relative to the current status of the automobile listed on the particular card.

5 Claims, 7 Drawing Figures

Patented Feb. 5, 1974

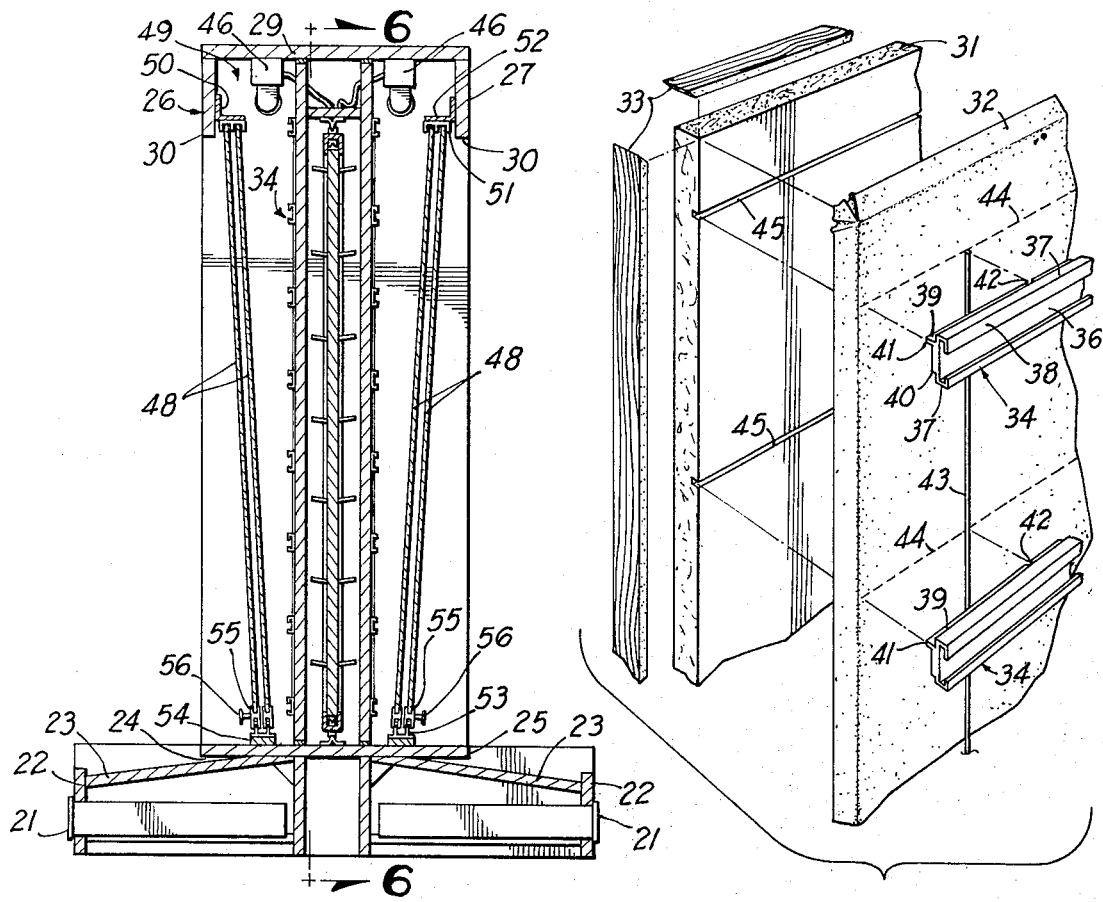
FIG 2
FIG 3
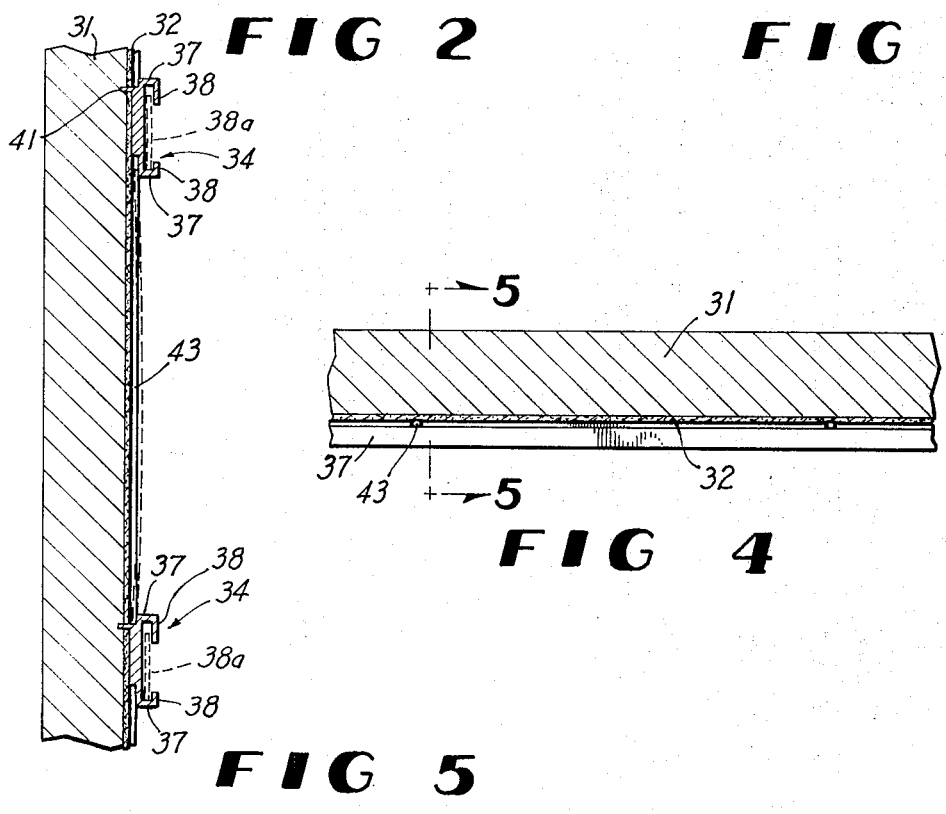
FIG 4
FIG 5

INVENTORY CONTROL APPARATUS

BACKGROUND OF THE INVENTION

This invention relates to a system of cataloging for ready reference information relative to each automobile available in a dealer's inventory and relates more particularly to an inventory control apparatus.

Anyone who has purchased an automobile from a dealer has been faced with the problem of determining what particular cars are in the dealer's stock at the present time. Usually, the salesman is unable to advise the customer of the current status of each of the cars in the dealer's automobile inventory, such as what style and colors are available on the lot.

Therefore, the salesman and the customer are required to conduct a physical examination of all the cars in stock, a time consuming and tedious process. Additionally, it usually happens that if a prospective buyer likes a certain car on the lot, the salesman will have to go back to the showroom to obtain a key for that particular automobile so that the buyer will be able to test drive that particular car.

SUMMARY OF THE INVENTION

The above disadvantages are overcome by the present invention which comprises an iventory control apparatus for use in an automobile dealer's showroom having an upright housing, a display area on the housing, means for releasably displaying within the display area a plurality of cards with each card containing information relative to an automobile in the dealer's inventory and a drawer slidably received within the housing which contains keys arranged in spaced relationship relative to each of the cards on the display area. The retaining means includes an upright backing, a resilient covering on the backing, support members transversely arranged across the covering in spaced, parallel relationship and spacer means in the form of positioning rods longitudinally disposed on the covering in spaced, parallel relationship.

The support members are substantially C-shaped in cross-section and include grooves in the top and bottom to receive therein the bottom of a first row of cards and the top of a second row of cards, respectively. Additionally, strips of identification material are received within the channel members so as to provide a means for readily identifying the cars described in detail on the cards supported by the support members. A projection transversely extends from the rear of the support member which is inserted through the resilient covering into complementary slots in the backing so as to anchor the support member onto the backing.

The drawer comprises an upright pegboard having a plurality of spaced pegs transversely projecting therefrom onto which are hung automobile keys, the pegs being arranged on the pegboard in relative position to the cards displayed on the display area, each peg corresponding in spatial relationship to a particular card.

A transparent covering is provided over the display area so that labels may be releasably fixed thereto to overlie particular cards to designate the current status of the automobiles represented by the respective cards.

It is, therefore, a primary object of the present invention to provide an inventory control apparatus whereby information relative to an inventory may be readily determined.

Another object of the present invention is to provide an inventory control apparatus for an automobile dealer which releasably displays a plurality of cards with each card displaying information relative to a particular automobile in the dealer's inventory.

A further object of the present invention is to provide an inventory control apparatus which will permit independent replacement of cards displayed thereon.

Another object of the present invention is to provide an inventory control apparatus for an automobile dealer which includes a means of releasably maintaining keys for automobiles in the dealer's inventory, the keys being arranged in relative spaced relationship to cards on the apparatus which describe the particular automobiles.

A still further object of the present invention is to provide an inventory control apparatus for an automobile dealer which employs a transparent covering over the display area so as to provide a surface onto which labels may be placed over respective cards on the display area so as to provide a means of determining the current status of each automobile described on the respective cards.

Still other objects and advantages of the present invention will become apparent after reading the accompanying description of the selected illustrative embodiment of the invention with reference to the attached drawings wherein like reference characters have been used to refer to like parts throughout the figures of drawings, and wherein:

BRIEF DESCRIPTION OF THE FIGURES OF DRAWING

FIG. 2 is a side elevational, cross-sectional view taken transversely through che display cabinet of the present invention;

FIG. 3 is an exploded perspective view of a portion of the display area on the inventory control apparatus;

FIG. 4 is a detailed top plan cross-sectional view of the display area;

FIG. 5 is a detailed side elevational view taken along line 5—5 in FIG. 4;

DESCRIPTION OF THE ILLUSTRATIVE EMBODIMENT

Figure 1:
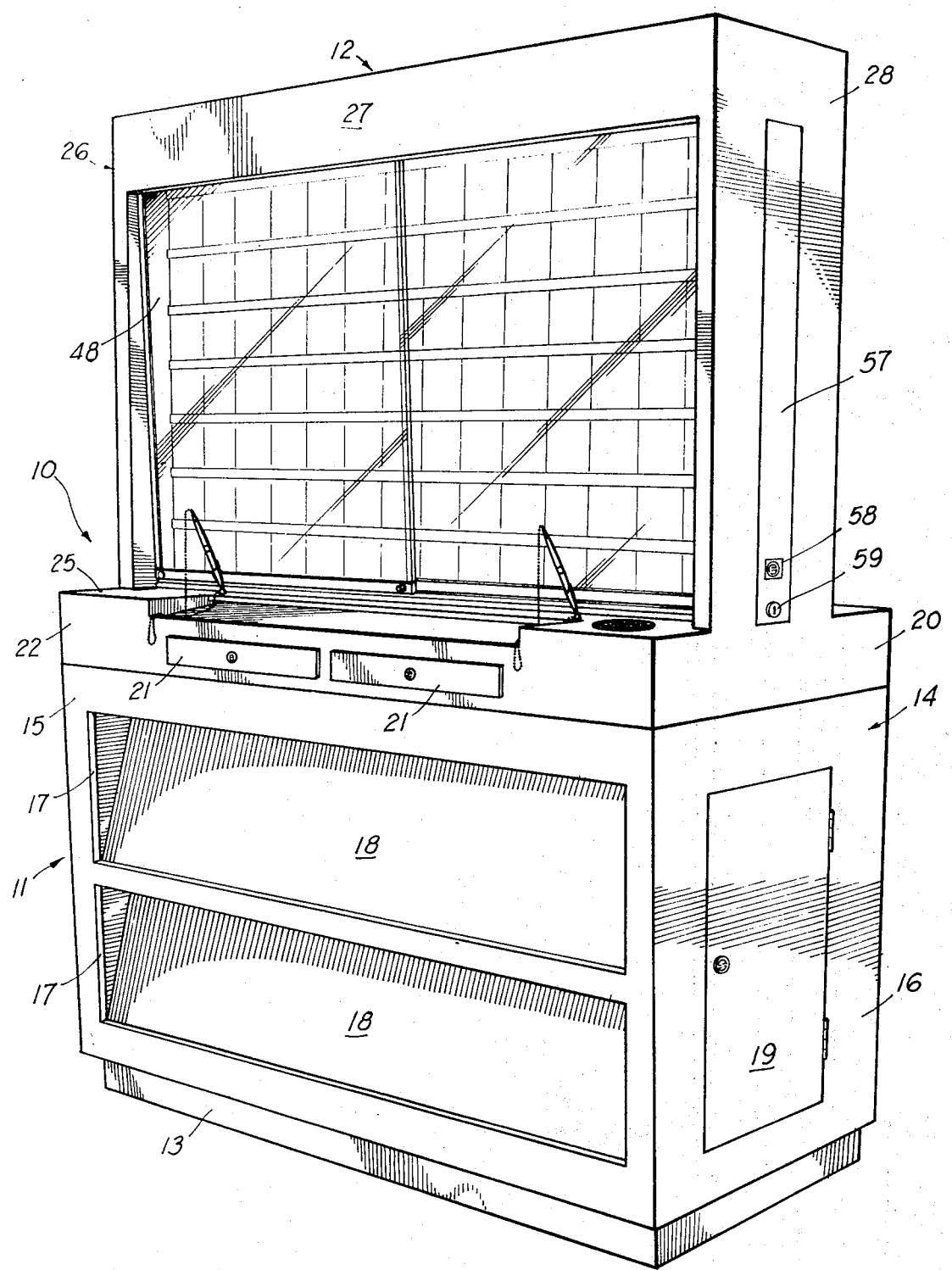
FIG. 1 is a perspective view of the present invention.

Referring now in detail to the embodiment chosen for the purpose of illustrating the present invention, numeral 10 denotes generally the inventory control apparatus as shown in FIG. 1.

The apparatus 10 as shown in FIG. 1 is double-faced with the other side of the apparatus 10 being identical to the side as depicted and includes a base support structure 11 and a housing 12. The base support structure 11 comprises an elongated, substantially rectangular body having a support base 13 and a literature display portion 14 disposed on the top of support base 13. Display portion 14 is of greater rectangular dimensions than supporting base 13 and includes front walls 15 and end walls 16. Transversely extending in parallel relationship along a portion of front wall 15 are a pair of rectangular openings 17 having shelves 18 disposed therein so as to provide support for literature, such as brochures, for the automobiles indexed within housing 12. Hinged panel 19 is provided on end wall 16 for access into a storage area (not shown) within base support structure 11 wherein is kept material such as brochures for shelves 18.

As seen in FIG. 1 and 2, the housing 12 is substantially in the shape of an inverted T and is secured to the top of literature display portion 14 along the base portion 20 of the inverted T. Base portion 20 has a substantially rectangular configuration and includes a pair of drawers 21 slidably received within the front wall 22. Drawers 21 are further areas of storage of various items used in connection with display cabinet 10. Directly above the drawers 21 is an upwardly canted surface 23 which forms at its upper extremity a wedge portion 24 with the top 25 of base portion 20. Writing pads may be releasably secured on surface 23 within wedge 24. As seen in FIG. 1, the top 25 may also include such items as pens and ashtrays.

Housing 12 includes an upstanding display portion 26 which is substantially rectangular in shape and having sidewalls 27 and end walls 28 and top 29. A rectangular opening 30 is transversely disposed through a large portion of wall 27.

Referring now to FIGS. 2 and 3, a display surface is positioned uprightly within the display portion 26 and comprises a backing 31 and a covering 32 which overlies backing 31. Backing 31 can be constructed of any hard material, such as chipboard, and covering 32 can be constructed of any resilient material, such as vinyl. As seen in FIG. 3, the edges of the covering 32 overlap the backing 31 and are secured together along the sides of backing 31 by strips 33.

Support means 34 are provided on covering 32 in a spaced, parallel relationship in a substantially horizontal plane. The support means 34 preferably are of one piece construction, such as extruded aluminum. As seen in FIGS. 3 and 5, support means 34 comprises a C-shaped channel member 35 having an upright base 36 and a pair of parallel arranged, laterally projecting sidewalls 37 which terminate in inwardly turned tabs 38. Base 36, sidewalls 37 and tabs 38 form an area in which is received strips 38a of material such as paper, onto which can be written information to categorize a row of cards associated beneath support means 34. Recesses 39 and 40 are formed along the top and bottom, respectively, of base 36 to provide surfaces to engage the bottom of a first set of cards and the tops of a second set of adjacently disposed cards. A projection 41 laterally extends across the rear face of base 36 adjacent the bottom of recess 39. Grooves 42 are longitudinally disposed through the projection 41 and the back of base 36 in equally spaced relationship and are in spaced alignment with grooves 42 in adjacent support means 34. Spacer means are longitudinally arranged in spaced, parallel relationship along covering 32 in the shape of small diameter, cylindrical rods 43. The rods 43 are held in place by engaging grooves 42 when projections 41 are inserted through slits 44 in covering 32 and are secured into notches 45 in backing 31, the notches 45 being in alignment with slits 44.

Figure 6:
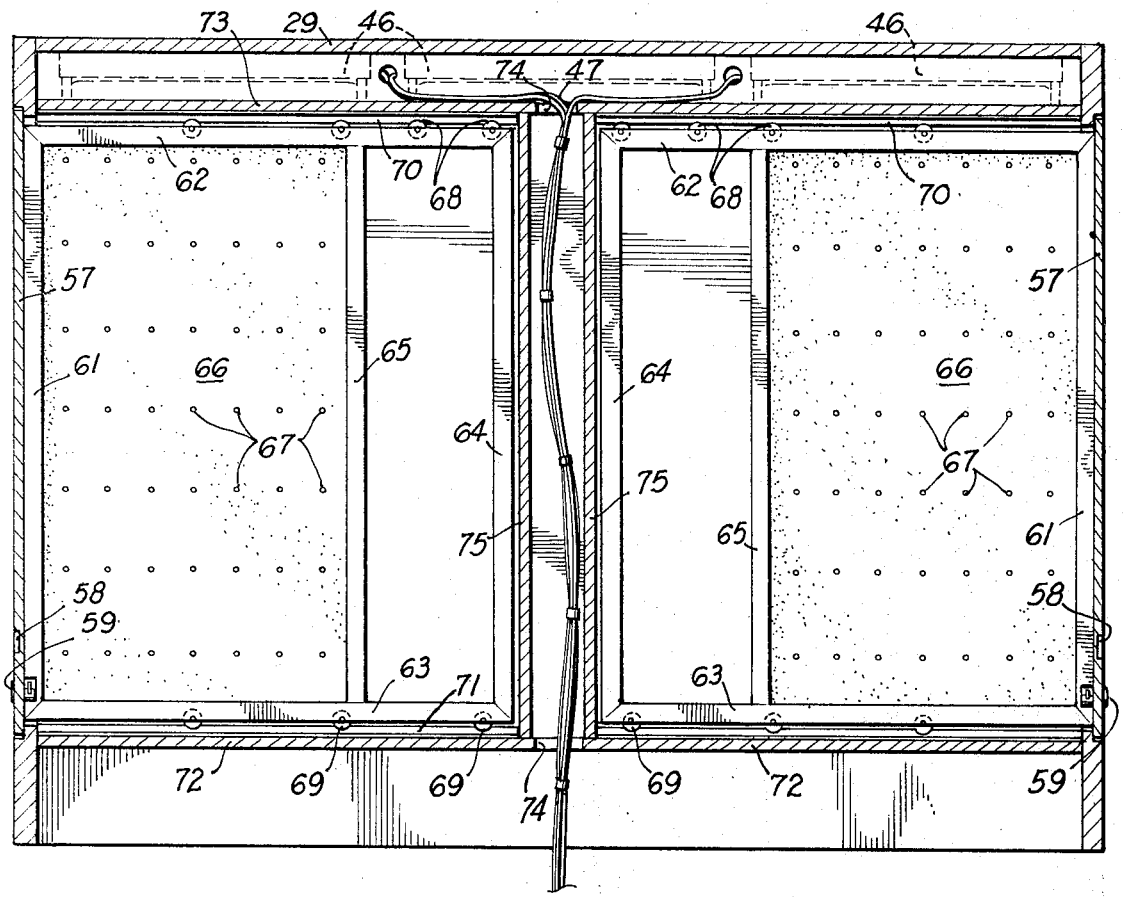
FIG. 6 is a side elevational cross-sectional view taken along line 6—6 in FIG. 2.

Flourescent light fixtures 46 are secured in front of the display area along the underside of the top 29. As seen in FIG. 6, wires 47 connect the fixtures 46 to a source of power (not shown).

Sliding glass panes 48 are provided in display portion 26 in front of the display surface. Panes 48 include L-shaped bracket 49 which are attached along their upstanding leg 50 to the back of wall 27 above opening 30. Double channel members 51 are attached to the bottom of the horizontal leg 52, each channel receiving therein the top edge of panes 48.

Inverted E-shaped members 53 are secured onto support blocks 54 which extend along top 25 across the display area. Members 53 are in engagement with the grooves of sheaves (not shown in detail) which are rotatably mounted within the bottom portion of H-shpaped channel members 55. The bottom edges of panes 48 are received within the top portion of channel members 55. Handles 56 are provided on channel members 55. The place-ment of bracket 49 and members 53 cause the panes 48 to assume an angled position within the display portion 26, as most clearly seen in FIG. 2. The panes 48 present a surface onto which labels or stickers can be removably placed so that they overlie particular cards on the display surface.

Figure 7:
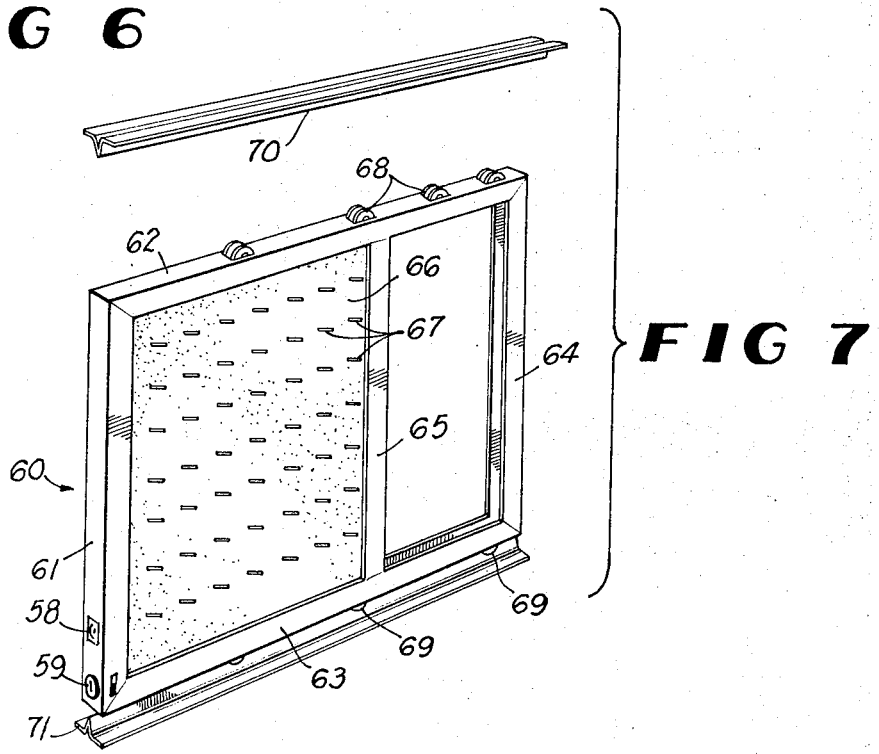
FIG. 7 is an exploded perspective view of the key drawer of the present invention.

Referring now to FIGS. 1, 6 and 7, means are provided on apparatus 10 for releasably maintaining a plurality of objects, such as keys, in spatial relationship to the cards on the display surface and is slidably received within the housing 12. The maintaining means includes a rectangular panel 57 in wall 28, with panel 57 having a recessed handle 58 and lock means 59. A frame 60 is secured to the back of handle 57 along one edge of upright front channel member 61. Horizontal channel member 62 and 63 are connected at right angles to the top and bottom, respectively, of member 61 with channel member 64 being secured to members 62 and 63 at their outer extremities.

Channel member 65 is connected between members 62 and 63 in an upright position in parallel relationship to members 61 and 64 so as to secure pegboard 66 within frame 60. An opening is thereby formed in frame 60 between channel members 65 and 64. Board 66 is provided with a plurality of laterally projecting pegs 67 which are spaced in vertical and horizontal alignment relative to each other and are arranged on board 66 relative to the cards displayed on the overlying display area.

Pulley-shaped wheels 68, 69 are rotatably supported along channel members 62, 63, respectively, so as to operate in a tracked relationship on tracks 70, 71, respectively. Track 70 is a V-shaped channel member with track 71 being inverted with respect to track 70.

As seen in FIG. 6, the frame 60 is supported within housing 12 by means of horizontal supports 72 and 73 with track 71 being secured to the top of support 72 and track 70 being secured to the bottom of support 73. Openings 74 are provided through the center portion of supports 72 and 73 to allow the wires 47 for the light fixture 46 to pass therethrough. Upright supports 75 are connected to support members 72 and 73 adjacent holes 74 and provide a means of limiting the movement of frame 60 along tracks 70, 71 within housing 12.

OPERATION

The apparatus 10 can be utilized in any situation wherein it is desired that items be catalogued or indexed. Preferably, the apparatus 10 would be placed in the showroom of an automobile dealership to provide, for both the dealer and the prospective car buyer, a ready means of obtaining information relative to the status of all the automobiles currently in the dealer's inventory. Each car would have a corresponding card on which is placed information such as style, color, options, engine size and price. The card would be positioned within the display area by having its bottom edge engage groove 39 of a first support means 34 and its top edge engage groove 40 of an adjacent second support means 34 disposed above the first support means 34. The side edges of the card will each abut a rod 43 so that each card is separated from an adjacent card, thereby allowing for easy, independent replacement thereof. The resilient backing 32 provides a "seal" between the back of the card and the supporting surface. Strips 38a are inserted between tabs 38 and base 36 and have writing thereon to categorize a card or row of cards located beneath the corresponding support means 34.

With the glass panes 48 in their closed position over the display area, there is provided a surface onto which labels such as "sold" or "hold" can be placed over particular cards to inform the salesman and the prospective buyer of the current status of the particular automobile.

After the buyer has had an opportunity to review all the cards in the apparatus 10 and wishes to test drive a selected car or cars, the salesman would then unlock lock means 59 and pull on handle 58, thereby causing frame 60 to roll out from within housing 12 along tracks 70 and 71. Each frame 60 would contain keys corresponding to half of the cards on one face of the display cabinet 10. Thus, if keys corresponding to a car having its card on the right half side of the display surface was desired, the right hand panel 57 would be pulled outwardly from housing 12 by means of handle 58, thereby exposing frame 60 with the keys thereon.

As seen in FIGS. 6 and 7, the pegboard 66 is not equal in dimension to one-half of the display area. Therefore, each peg 67 is not located directly behind its corresponding card; instead, pegs 67 are situated on pegboard 66 in relative spatial position to the overlying cards. In this manner, the pegboard 66 can be fully withdrawn from housing 12 without fully extending frame 60, thereby reducing the chances of frame 60 sliding off tracks 70 and 71. When the frame 60 is withdrawn from housing 12 so that pegboard 66 is fully exposed, the weight of the board 66 and the keys thereon causes a great downward thrust which would tend to tilt the frame 60 at an angle. To prevent this, two of wheels 68 are provided close together near channel member 64 to keep the frame 60 in a tracked relationship in this extended position.

While the embodiment depicted shows a two-faced inventory control apparatus 10, it is understood that the apparatus 10 could be constructed having only one face or display surface. Additionally, the housing 12 could be wall-mounted, thereby eliminating the need for base support structure 11.

It is obvious that one skilled in the art may make modifications in the details of construction without departing from the spirit of the invention which is set out in varying scope in the appended claims.

What is claimed is:

1. An inventory control apparatus, comprising:
   a. a housing;
   b. a display area on said housing;
   c. means of releasably displaying within said display area a plurality of rectangular cards in juxtaposition; and
   d. means slidably disposed within said housing behind said display means for releasably maintaining a plurality of objects in spatial relationship to each of said cards.
   said display means including an upright display surface, a plurality of support members for said cards disposed on said surface in spaced, parallel relationship, a plurality of spacer means disposed in spaced, parallel relationship on said surface in perpendicular alignment to said support members, said spacer means and support members maintaining said cards in transverse alignment on said surface and in juxtaposition relative to each other, said support members further including means for engaging the bottom of a first set of said cards and the top of a second adjacent set of said cards, and means for receiving strips of material having thereon identification of a set of adjacent cards supported by said support member, and said display means further including a resilient covering positioned between said display surface and said support members to provide a surface onto which said printed material is disposed.

2. An apparatus as claimed in claim 1 wherein said support members include a C-shaped channel member for receiving therein said strips and wherein said engaging means comprises a groove on the top surface of said channel member for engagement of said first set of cards and a second groove on its bottom surface for engagement with said second set of cards.

3. An apparatus as claimed in claim 2 wherein said maintaining means includes a support surface and a plurality of projections laterally disposed therefrom, each of said objects being maintained on a projection.

4. An inventory control apparatus comprising a housing; a first panel movably mounted within said housing; means for releasably maintaining a set of keys on said first panel; a second panel mounted within said housing; means for releasbly maintaining a set of indicia bearing cards substantially coplanar on said second panel; and a transparent third panel overlaying said second panel upon which indicia bearing labels may be removably placed to overlay selected cards releasably maintained on said second panel.

5. An inventory control apparatus in accordance with claim 4 comprising lock means for restricting access to said first panel from within said housing.

* * * * *